United States Patent [19]
Löblich et al.

[11] Patent Number: 4,792,350
[45] Date of Patent: Dec. 20, 1988

[54] METHOD OF GRANULATING WATER SOLUBLE FERTILIZER WITH HIGH KIESERITE CONTENT

[75] Inventors: Karl-Richard Löblich, Barsinghausen; Günter Bruns, Wennigsen; Gerd Peuschel, Burgdorf, all of Fed. Rep. of Germany

[73] Assignee: Kali & Salz Aktiengesellschaft, Kassel, Fed. Rep. of Germany

[21] Appl. No.: 54,949

[22] Filed: May 27, 1987

[30] Foreign Application Priority Data

May 28, 1986 [DE] Fed. Rep. of Germany ....... 3618058

[51] Int. Cl.$^4$ ............................ C05G 3/00; C05D 5/00
[52] U.S. Cl. ........................................... 71/11; 71/63; 71/64.03; 71/DIG. 1
[58] Field of Search .................... 71/11, 31, 63, 64.03, 71/64.11, 64.12, DIG. 1

[56] References Cited

U.S. PATENT DOCUMENTS 3,926,609 12/1975 Effmert et al. ......................... 71/31

FOREIGN PATENT DOCUMENTS 0148512 5/1981 Fed. Rep. of Germany .......... 71/61

Primary Examiner—Ferris H. Lander
Attorney, Agent, or Firm—Michael J. Striker

[57] ABSTRACT

A method of granulating of water soluble fertilizers which contain kieserite with a mass content of between 25 and 100% and which have primary particles within a very wide grain spectrum with a fraction of at least 20% under 0.09 mm, includes the steps of providing a granulating material including kieserite, applying to the granulated material moisturizing liquid, prior to or during applying the moisturing liquid adding to the granulating material soluble and/or somewhat collodial soluble substances from the class of mono-, di- and polysaccharide and/or their simple hydrophilic derivatives in solid form or in a solution in which they provide a main part, in a dose of between 0.1 and 5% dry mass relative to a dry weight of the fresh granulated material, forming the granules, and drying the granules after their formation to a residual moisture of 1 to 6% of kieserite mass contained in them.

8 Claims, No Drawings

METHOD OF GRANULATING WATER SOLUBLE FERTILIZER WITH HIGH KIESERITE CONTENT

BACKGROUND OF THE INVENTION

The present invention relates to a method of granulating water soluble fertilizers with high kieserite content.

The plant nutrient magnesium has been of increased importance in last years in agriculture and forestry, since many soils are substantially depleted of magnesium on different reasons. The naturally present magnesium sulfate mineral kieserite has been recognized as especially suitable for elimination of acute deficiency of such soils. In comparison to consumption time also for plants with short vegetation time, the kieserite provides for fast solution, despite the fact that its speed of solubility in laboratory measurements is lower than for other easily water soluble fertilizer salts. Since it permits to obtain higher ion concentration in the soil solution than other compositions of magnesium, the magnesium intake by the plants is substantially facilitated even in stress conditions.

The modern processing of natural crude salt produces a crystalline kieserite product with a grain size between 0.1 and 1 mm, which is approximately dust free and therefore, is favorable for environmental protection during application on fields and in forests. However, for application devices which are used now, this grain size is disadvantageous. It is, therefore, required to increase the size of the kieserite grains by granulation, so that it would be suitable for grained fertilizers and for dispersion characteristic of the application devices.

The granulation of pure kieserite and easily soluble fertilizers which include a kieserite in quantity more than one fourth of their mass is unexpectedly a very difficult operation, despite the fact that kieserite in combination with fertilizing materials unsoluble in pure water, such as for example slag and/or rock milling, is known as a preferable binder. This is disclosed in the German patent application P 3,541,184.8. This fact is associated with the physical and chemical properties of the kieserite and of the substances with which it is combined. The observed phenomenon can be, however, important only partially. Mainly, granulation experiments are interpreted empirically.

Several granulation methods have been proposed for solving the above described objects which, however, are not satisfactory for the stability of the obtained granules, or reduce the magnesium contents because of the addition of auxiliary matter, or have unfavorable cost of granulation processes.

In accordance with the solution proposed in the German Pat. No. 1,183,058, crystallization water of the kieserite is thermally removed before the granulation. As a result of this, the material becomes more active and can be hydrated faster. The primary particles in the granules are connected with one another because of the formation of hydrate. Disregarding the fact that the calcination causes high energy costs, the moisturized granulating mass is bound too fast, whereby the product grain yield is low. The German Pat. No. 2,106,212 proposes to bring calcium sulfate-magnesium sulfate hydrate in moisturized form into a rotary drum, to roll the same in the drum and heat to the temperature of between 250° and 250° C., so that the granules are reinforced by sintering. Here, also, an extremely high energy consumption is needed. The proposal disclosed in the German Pat. No. 2,316,703 is favorable from an energy point of view. Here fresh artificial langbeinite is added to potassium salt-kieserite mixture. This method is successful for granulation of predetermined calcium sulfate-kieserite mixtures. However, from the quality point of view it is not transferable to all conditions of mixing. Moreover, fresh langbeinite is not cost-favorable from all standpoints.

The method disclosed in the German Pat. No. 2,748,152 uses ammonium sulfate as granulation auxiliary material for kieserite. The moisturized granulating product is rolled and then dried over the surface. The rigidification is performed by a hydration during extremely long maturing time, and provides wear resistant. granules. The maturing process is, however, very difficult to control in practice.

During granulation of kieserite in accordance with the proposal of the German Pat. No. 3,148,404, significantly better results are obtained. This is especially true when natrium sulfate is used as granulating auxiliary material. What is disadvantageous in this method is that a high quantity of additives is required during the operation, for obtaining sufficiently wear-resistant granules. For producing the hydrate binding, also significant water quantities must remain in product which, naturally lowers the nutrient content.

An important presumption for the granulation of kieserite, it is a wide grain spectrum with a high fraction of fine product under 0.09 mm. Thereby, during formation of individual granules by rolling, a high packing density is obtained which substantially contributes to mechanical strength.

Such a granulating product with ideal primary grain distribution is moisturized with water, sufficient grain strength is obtained during rolling which can be reinforced to form wear resistant structures by maturing or drying. In unexpected manner, such a product is stable under storage conditions not longer than three weeks. The bursting strength of the kieserite granules dried to 2% residual moisture in accordance with this method reaches a maximum after five days storage with 20 N/grain and falls after three-four weeks to 7 N/grain, while the wear in the test increases from 4 to 38%.

Kieserite mixtures with increased addition of calcium sulfate behave similarly, when not so completely extreme. For example, a mixture of approximately 23 weight per parts of calcium sulfate and 77 weight parts of technical kieserite with optimum grain spectrum reaches after the granulation and drying, in five days a bursting strength of 28 N/grain, which after four weeks falls to 19 N/grain, wherein the wear increases to 15%. Other disadvantageous observations have been made with respect to mixtures containing the calcium sulfate. Since the initially optimally moisturized granulating mixture tends to warming and to premature drying, the size distribution of the granules obtained by rolling becomes very unfavorable. The back product circulation is strongly loaded both because of a high under-grain fraction, and because of gravel-like under grain. The cause for these conditions is fast hydration of finest kieserite particles and their addition with the calcium sulfate to make double salt.

During granulation of mixtures with calcium chloride and a kieserite fraction over 30%, additionally an increased sensitivity to air moisture takes place. This can be explained by the hydroscopic ability of the magnesium chloride produced during formation of sulfatic double salt.

It was found in a surprising manner that the substances from the class of sugar and their hydrofilic derivatives delay the undesirable processes in moisturized kieserite mixtures and suppress the structure loosening in granules during long storage. The mixtures do not dry during rolling prematurely and show during storage, in contrast to the granules with the above additions, no blooming.

SUMMARY OF THE INVENTION

Accordingly, it is an object of the present invention to provide a method of granulating water soluble fertilizers with high kieserite content, which avoids the disadvantages of the prior art.

In keeping with these objects and with others which will become apparent hereinafter, one feature of the present invention resides, briefly stated, in a method of granulating water soluble fertilizers which contain kieserite with a mass content of between 25 and 100% and in which primary particles have a very wide grain spectrum with a fraction of at least 20% under 0.09 mm, in accordance with which before or during adding a moisturizing liquid to a granulating product, soluble and/or somewhat colloidal soluble substances from the class of mono-, di- and polysaccharides and/or their simple hydrophilic derivatives in solid form or as a solution with a solid matter forming a main part of the solution are added, in a dose between 0.1 and 5% dry mass relative to the dry weight of a fresh granulating mixture, and the granules after their formation are dried to a residual moisture of 1 to 6% of kieserite mass contained in them.

In accordance with another feature of the present invention, the method includes the utilization of saccharose in solid form or as sugar melasse in a dose of 1 to 5% dry matter on the fresh kieserite containing granulating mass.

Still a further feature of the present invention is that the method utilizes invert sugar.

In accordance with still a further feature of the present invention is that lactose, for example in form of whey or of concentrated residual liquid of the milk albumin recovery is added to the kieserite-containing granulating product, in a dose of from 0.5 to 4% dry matter to the fresh product.

In accordance with still a further feature of the present invention, the mono- and/or disaccharide together with soaked starch are added in mass ratio 1:2 to 2:1 in a dose of the saccharide mixture of 0.3 to 2%.

Finally, in accordance with another feature of the present invention, a hydrophilic sugar derivative such as for example carboximethyl cellulose or an amino sugar is added to the sugar material.

DESCRIPTION OF PREFERRED EMBODIMENTS

In the method of the invention, water soluble fertilizers which contains kieserite with a mass content of between 25 and 100% and in which primary particles have a very wide grain spectrum with a fraction of at least 20% under 0.09 mm, are granulated. In accordance with the present invention, before or during adding a moisturizing liquid to a granulating product, soluble and/or somewhat colloidal soluble substances from the class of mono-, di- and polysaccharides and/or their simple hydrophilic derivatives in solid form or as a solution with a solid matter forming a main part of the solution are added, in a dose between 0.1 and 5% dry mass relative to the dry weight of a fresh granulating mixture, and the granules after their formation are dried to a residual moisture of 1 to 6% of kieserite mass contained in them.

In the inventive method saccharose is used in solid form or as sugar melasse in a dose of 1 to 5% dry matter on the fresh kieserite containing granulating mass. Invert sugar can be used in the method.

In the present invention lactose can be added, for example in form of whey or of concentrated residual liquid of the milk albumin recovery, to the kieserite-containing granulating product, in a dose of from 0.5 to 4% dry matter to the fresh product.

The mono- and/or disaccharide together with soaked starch can be added in mass ratio 1:2 to 2:1 in a dose of the saccharide mixture of 0.3 to 2%. Finally, a hydrophilic sugar derivative such as for example carboximethyl cellulose or an amino sugar is added to the sugar material.

It is known to use sugars, for example in form of sugar-rich melasse in food industry as an auxiliary means for of crushed food base material of vegetable or animal origin. However, it has never been used for fertilizers. In the case of food material, the sticking and dust-forming action of the sugar solution is predominant, and the moisture-controlling property is only secondary. Since the sugar-containing waste material forms a nutrient value itself, it is added in a high dose for forming the food base material.

With regard to the prior art it was shown that during granulation of kieserite-rich fertilizing mixtures, not only sticking of the primary particles by auxiliary material takes place. Granules of pure kieserite are obtained with a sufficient strength without auxiliary material. During storage, however a structure change takes place, which more and more reduces the resistance to wear. The interbinding of the primary particles during granulation of kieserite-containing mixtures with calcium sulfate takes place faster, since in this case it leads to formation of bridges of hydrated magnesium sulfate by formation of double salt crystals. Since the kieserite mixtures contained in the calcium sulfate leave the process very fast, the product grain yield at the end of the rolling process is very poor. It also deals with the fact that the process of hydration and crystallization which takes place during formation of granules is initially braked by the additions and then directed in a direction to bring storage-stable bridges between the primary particles and the granules.

It was also found that in granulating mixtures of phosphate slag powder and calcium chloride, the product quality is improved by the addition of sugar-like substances to the granulating mass. This takes place only with pure starch since molecularly dispersed soluble sugar reduces the strength against wear. From the above, it is clear that the favorable action of sugar-like substances upon kieserite-rich products from water-soluble fertilizing salts cannot be considered as obvious.

The invention illustrated by following examples:

EXAMPLE I

A mixture of 23 weight parts of calcium sulfate and 77 weight parts of kieserite is used. Three weight parts of melasse with 70% moisture content and 9 weight parts of water is added to the mixture. After mixing and rolling, the granules are dried to 2% residual moisture. The initial moisture was substantially lower than in the granules without melasse, and then it raises during storage. After four weeks the test shows 6% wear relative to 15% with non-treated granules. The product grain yield lies with 50% considerably over the yield of 36% with mixing without melasse.

EXAMPLE II

The mixture is calcium sulfate-kieserite mixture of the previous example. Three weight parts of an invert sugar solution with a solid matter content of 40% is added to the mixture. The produced granules are dried to 1.5% residual moisture, and after four weeks have the wear of 8%. The product grain yield lies at 48%.

EXAMPLE III

The mixture is to 225 weight parts of calcium sulfate, 400 weight parts of freshly prepared kieserite with an average grain size approximately 0.4 mm, and 365 weight parts of a milled kieserite in which at least 80% goes through a sieve of 0.09 mm mesh value. Six weight parts of melasse and two weight parts of starch colloidally dissolved in 40 weight parts of water by heating, and 80 weight parts of water are added to the mixture and mixed thoroughly. The granules obtained by rolling of this moist mixture have high grain strength with very good yield. After drying of the granules to 2% residual moisture, 9% wear is determined in the tests, which comes back very fast to 6%. After four weeks of storage bursting strength is 37 N/grain and a wear is 4%.

EXAMPLE IV

The grain granules from Example III are dried to 4.5% residual moisture and tested as to wear. Directly after drying it is 12%, then the wear resistance is improved fast to the same value as in the Example III.

After four weeks storage the wear test shows 5%. Also with the higher residual moisture the storage property is good.

EXAMPLE V

The mixture contains 500 weight parts of calcium sulfate and 500 weight parts of kieserite of suitable grain size. 110 weight parts of water with the addition of ten weight parts of a milled concentrate with 50% solid matter and one weight part of carboximethyl cellulose is added to the mixture, mixed and granulated. After drying to 2.5% residual moisture, the granules are obtained which in the beginning is wear-resistant. After four weeks storage the wear is 3%.

It should be emphasized with respect to Examples I to V that the granule quality does not change substantially when the above presented compositions are supplied with back product in form of milled over- or under-grain. The additional material is related in the case only to the fresh product fraction, while the quantity of moisturizing liquid is measured to the granulating property of the entire mixture with inclusion of the back product portion.

EXAMPLE VI

Pure kieserite with optimal grain size is mixed with 5 weight parts of lactose to 1000 parts of kieserite, moisturized with magnesium sulfate solution for granulating, and rolled. Green strong granules with high yields are produced. The dry granules have 2% residual moisture, and after four weeks storage have a bursting strength of 24 N/grain and wear 6%.

EXAMPLE VII 400 weight parts of kieserite back product with an average grain size of approximately 0.2 mm is mixed with 600 weight parts of fresh kieserite in which ⅓ can go through a sieve of 0.09 mm. This mixture is moisturized with a mixture of 70 weight % of water and 12 weight % of residual liquid from milk alumin recovery concentrated to 60% solid matter content, and then processed during three minutes in plow share mixer.

Grain-strong granules are produced by rolling. They have bursting strength immediately after drying to 5% residual moisture of 6 N/grain, to 2% residual moisture of 9 N/grain, and to 1% residual moisture of 12 N/grain. The wear resistance is satisfactory in the very beginning. After four weeks storage with a residual moisture 1 to 5%, the wear is 2 to 4% and a bursting strength is between 30 and 40 N/grain. Residual moisture which is lower or higher than 1 to 5% substantially worsens the granule quality.

It should also be emphasized that small addition of amino sugar to normal sugar can allow substantial reduction of additional quantities of granulating auxiliary material. The use of the above mentioned granulating auxiliary material is naturally a question of supply costs in practice. Melasse or concentrated residual liquids of the milk processing are very cost favorable in comparison with the pure sugars. Their utilization is advantageous, especially since it was shown in laboratories and operational tests that foreign matter which is contained in technical sugar solutions somewhat improves the granulating yield. Starch and expensive sugar derivatives are added when it is desirable to reduce the entire quantity of granulating auxiliary material with maintaining the product quality.

When the method is performed in accordance with the present invention, granules of kieserite-rich water soluble fertilizers are obtained with a smoother outer surface than those obtained from known or tested methods.

The technological progress which is achieved in the method in accordance with the present invention is that with favorable auxiliary material dosing between 0.5 and 2% and the drying to preferable residual moisture of 1 to 2.5%, the nutrient matter contents in the product is reduced to approximately only 95.5 to 97% of the contents of the base material to be granulated. In the known or tested methods, the contents reduction is between 8 and 12%.

It will be understood that each of the elements described above, or two or more together, may also find a useful application in other types of methods differing from the types described above.

While the invention has been illustrated and described as embodied in a method of granulating of water soluble fertilizers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of granulating of water soluble fertilizers which contain kieserite with a mass content of between 25 and 100% and which have primary particles within a very wide grain spectrum with a fraction of at least 20% under 0.09 mm, the method comprising the steps of providing a granulating material including kieserite; applying to the granulated material moisturizing liquid; prior to or during applying the moisturizing liquid, adding to the granulating material soluble and/or somewhat colloidal soluble substances from the class of mono-, di- and polysaccharide and/or their simple hydrophilic derivatives in solid form or in a solution in which they provide a main part, in a dose of between 0.1 and 5% dry mass relative to a dry weight of the fresh granulated material; forming the granules; and drying the granules after their formation to a residual moisture of 1 to 6% of kieserite mass contained in them.

2. A method as defined in claim 1, wherein said adding includes adding of saccharose in solid form or as sugar-rich melasse in a dose of 1 to 5% dry material to the fresh kieserite-containing granulating material.

3. A method as defined in claim 1, wherein said adding step includes adding invert sugar in solid or dissolved form.

4. A method as defined in claim 1, wherein said adding step includes adding lactose in a dose of 0.5 to 4% dry material to the fresh granulating material.

5. A method as defined in claim 1, wherein said adding step includes adding the lactose in form of milk or concentrated residual liquid of milk albumin recovery.

6. A method as defined in claim 1, wherein said adding step includes adding the mono and/or disaccaharide together with soaked starch in mass ratio 1:2 to 2:1 in a dose of the saccharide mixture of 0.3 to 2%.

7. A method as defined in claim 1, and further comprising the step of adding to the sugar-like material of a hydrophilic sugar derivative or an amino sugar.

8. A method as defined in claim 7, wherein said step of adding to the sugar-like material of a hydrophilic sugar derivative includes adding of carboximethyl cellulose.

* * * * *